(12) United States Patent
Marino et al.

(10) Patent No.: US 6,259,862 B1
(45) Date of Patent: Jul. 10, 2001

(54) RED-EYE REDUCTION USING MULTIPLE FUNCTION LIGHT SOURCE

(75) Inventors: John Anthony Marino, Conesus; James Vergil Leavy, Churchville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/782,853

(22) Filed: Jan. 13, 1997

Related U.S. Application Data

(63) Continuation of application No. 08/420,274, filed on Apr. 11, 1995, now abandoned.

(51) Int. Cl.[7] ............ G03B 13/36; G03B 15/03; G03B 17/18
(52) U.S. Cl. ............ 396/106; 396/157; 396/286
(58) Field of Search .................... 396/106, 157, 396/286, 264

(56) References Cited

U.S. PATENT DOCUMENTS

| | | | |
|---|---|---|---|
| 4,015,119 | 3/1977 | Miyake | 250/214 |
| 4,258,290 | 3/1981 | Nakajima | 315/135 |
| 4,272,176 | 6/1981 | Maitani et al. | 354/238 |
| 4,285,588 | * 8/1981 | Mir | 354/137 |
| 4,500,193 | 2/1985 | Suzuki et al. | 354/471 |
| 4,908,649 | * 3/1990 | Matsui et al. | 396/286 X |
| 4,959,679 | * 9/1990 | Yamamoto et al. | 396/264 X |
| 5,097,284 | * 3/1992 | Taniguchi et al. | 354/415 |
| 5,317,362 | * 5/1994 | Takahashi | 354/418 |
| 5,448,331 | * 9/1995 | Hamada et al. | 354/403 |

* cited by examiner

Primary Examiner—W. B. Perkey
(74) Attorney, Agent, or Firm—Francis H. Boos, Jr.; Ronald R. Schindler, II

(57) ABSTRACT

A camera auxiliary light system provides supplemental illumination for a passive ranging system in determining camera-to-object distance, provides a self-timer activation status light to persons in a scene, provides a point of visible light to assist in aiming the camera, and provides red-eye reduction illumination. Thus, multiple functions are performed by a single auxiliary light, thereby reducing the number of camera elements and reducing camera cost, size, and weight. The system includes an auxiliary light source, a mode control switch that selects between a self-timer mode, a red-eye reduction mode, and a flash defeat mode, a light sensor that receives light from the scene and produces a signal that indicates the relative amount of light that was received, and a light source controller that controls operation of the auxiliary light source in response to actuation of a shutter release of the camera.

45 Claims, 8 Drawing Sheets

RED-EYE REDUCTION USING MULTIPLE FUNCTION LIGHT SOURCE

This is a continuation of application Ser. No. 08/420,274, filed Apr. 11, 1995 now ABN.

BACKGROUND OF THE INVENTION

1. Field of the Invention

This invention relates generally to camera auxiliary lighting systems and, more particularly, to using auxiliary light sources for reduction of red-eye effects.

2. Description of the Related Art

In capturing images of a scene with a camera, such as producing photographic exposures or recording digital representations, it frequently is necessary to supplement ambient light in the scene with light from a high-energy auxiliary light source. A typical auxiliary light source is an electronic strobe, commonly referred to as a flash unit. A flash unit includes capacitors that store a relatively large electrical charge and then discharge it through a flash tube, such as a xenon flash bulb, that achieves fill illumination intensity very quickly. A shutter mechanism of the camera is operated while the flash unit capacitors are discharged, thereby capturing the illuminated scene on film or in digital storage. The supplemental illumination provides the increased ambient light level needed for a proper exposure. Automatic exposure systems on cameras with flash units can be designed so they sense when the ambient light level is not sufficient for a properly exposed image to be produced and automatically operate the flash unit with the shutter mechanism to achieve proper exposure.

When the ambient light level is sufficiently dark that supplemental illumination is necessary, it also is likely that the pupils of persons in the scene are dilated. Because the flash unit so quickly reaches its full brightness, the supplemental light can reflect into the eyes of the persons in the scene before their pupils can react to the bright supplemental illumination and close down, or constrict. As a result, the blood supply in the retinas of their eyes sometimes can be illuminated and visible in the captured image, resulting in an effect referred to as "red-eye". Such effects are very unnatural appearing and therefore many cameras with automatic exposure/flash systems are designed to avoid the red-eye effect. For example, some cameras locate the flash tube as far away as possible from the optical axis of the camera objective lens. This reduces the red-eye effect somewhat because the light illuminating the retina cannot reflect straight back into the objective lens and through the shutter to appear in the captured image. Rather, some of the light is reflected away from the optical axis of the camera lens.

Other cameras reduce red-eye with one or more secondary capacitors that discharge and illuminate a secondary light source, such as a halogen bulb, before the primary capacitors illuminate the primary light source (the flash unit). The secondary light source is not necessarily of sufficient brightness to provide correct exposure, but is of sufficient brightness so the pupils of persons in a scene will react to the secondary light and constrict. Thus, the secondary light provides an automatic "pre-flash" illumination that occurs sufficiently before the primary illumination to prevent the blood in the retinas of the eyes from being visible in the captured image, thereby reducing or eliminating the red-eye effect. Unfortunately, the extra capacitors and bulbs add to the cost, size, and weight of the camera and place added demands on the camera batteries.

Many compact cameras have multiple light sources that perform multiple indicating functions. For example, infrared light sources not visible to the human eye are often used for automatic ranging systems. Visible, red or white light sources are often used for pre-flash illumination. Often red-color lights are used for self-timer indication, low battery, and flash-ready lights. It is generally desirable to use a single light source to perform multiple functions, because this usually decreases cost, size, and weight of the camera and can reduce operational demands on the camera batteries. For example, U.S. Pat. No. 4,500,193 to Suzuki et al. describes a camera in which an under-exposure indication and a shutter release indication are provided by the same indicator light. Similarly, U.S. Pat. No. 4,272,176 to Maitani et al. describes a camera in which a battery check status and self-timer operation are both indicated by a single light source. The consolidation of light source functions has been extended to include red-eye reduction systems. For example, it is known to use the halogen bulb of a pre-flash red-eye reduction system to also indicate self-timer operation. When the flash unit must be activated for proper exposure under low light conditions, the red-eye reduction system is activated and the pre-flash illumination is provided. The full intensity supplemental illumination and shutter opening then takes place.

Combining the self-timer indicator light and red-eye reduction light together provides some consolidation of elements. Not all cameras, however, include self-timer systems. Moreover, cameras typically include a variety of other light sources. Maximum consolidation benefits, in terms of the numbers of light sources combined on any one camera and in terms of the number of cameras that would benefit, would be achieved if the light sources for more universally-installed systems and for additional functions could be combined with red-eye reduction light sources.

From the discussion above, it should be apparent that there is a need for red-eye reduction systems that combine the light source for the red-eye reduction system with the light source for other common camera systems, thereby achieving greater reduction of camera cost, size, and weight over the greatest number of cameras. The present invention fulfills this need.

SUMMARY OF THE INVENTION

The present invention provides an auxiliary light system for a camera that includes a single multiple-function auxiliary light source for supplemental visible-light illumination in automatic ranging, self-timer indication, camera aiming, and red-eye reduction. The auxiliary light source projects visible light into a scene so the light can be received by a passive automatic ranging system of the camera. The auxiliary light system further includes mode control switches that select between a self-timer mode, a red-eye reduction mode, and a flash defeat mode, a light sensor that receives light from the scene and produces a signal that indicates the relative amount of received light, and a light source controller that controls operation of the auxiliary light source in response to actuation of a shutter release of the camera. The light source controller responds to mode control switch selection of the red-eye reduction mode by operating the auxiliary light source at a first brightness level if the light source controller received a low-light indication from the passive ranging system, wherein the passive ranging system responds to the light sensor signal by determining distance from the camera to an object in the scene and produces the low-light indication if the light received was insufficient to determine the distance to the object. The light source controller responds to mode control switch selection of the self-timer mode by operating the auxiliary light source for a predetermined time interval at a second brightness level, and responds to mode control switch selection of the flash defeat mode by inhibiting operation of a flash system. Thus, the auxiliary light source provides supplemental illumination for a passive ranging system in determining camera-to-object distance, simultaneously provides a point of visible light for aiming the camera, provides a self-timer activation status light to persons in the scene, and provides red-eye reduction illumination for flash photography. In this way, multiple functions are performed by a single auxiliary light, thereby reducing the number of camera elements and reducing camera cost, size, and weight.

In one aspect of the invention, different auxiliary light source illumination intensity levels are provided by the light source controller, depending on the function being performed. The light source controller provides the brightest illumination intensity for the passive ranging function and the red-eye reduction mode. In another aspect of the invention, the illumination intensity can be controlled by one or more electronic switches that control current through the auxiliary light source. The intensity control provides a relatively low-power consumption, low-cost circuit with few elements. Such an arrangement permits relatively simple control of the auxiliary light source duty cycle so that different auxiliary light blinking rates can be implemented, providing greater flexibility in lighting functions.

In another aspect of the invention, the light source controller adjusts the illumination intensity of the auxiliary light source in response to ambient light level information from the exposure sensing system of the camera. For example, during the red-eye reduction mode, the light source controller can respond to a relatively dark ambient scene by setting the illumination intensity at a high level and can respond to a relatively bright ambient scene by setting the illumination intensity at a lower level. Adjusting the illumination intensity in this way is advantageous because, in a dark scene, the pupils of persons in the scene likely will be at maximum dilation and therefore require a relatively bright light to ensure timely and sufficient constriction. Conversely, the pupils will not be as dilated in a bright scene and therefore the illumination intensity need not be so high. During the self-timer mode, the light source controller can respond to a relatively dark scene by setting the illumination intensity at a lower level and can respond to a bright scene by setting the illumination intensity at a higher level. Adjusting the illumination intensity in this way is advantageous because, in a dark scene, the eyes of persons will be most sensitive to light and viewing an auxiliary light of increased intensity for the duration of the self-timer mode otherwise could become annoying. Conversely, increased illumination intensity during the self-timer mode would be beneficial in a bright room to better enable persons to discern the status of the self-timer.

Other features and advantages of the present invention should be apparent from the following description of the preferred embodiments, which illustrate, by way of example, the principles of the invention.

DESCRIPTION OF THE PREFERRED EMBODIMENTS

Figure 1:
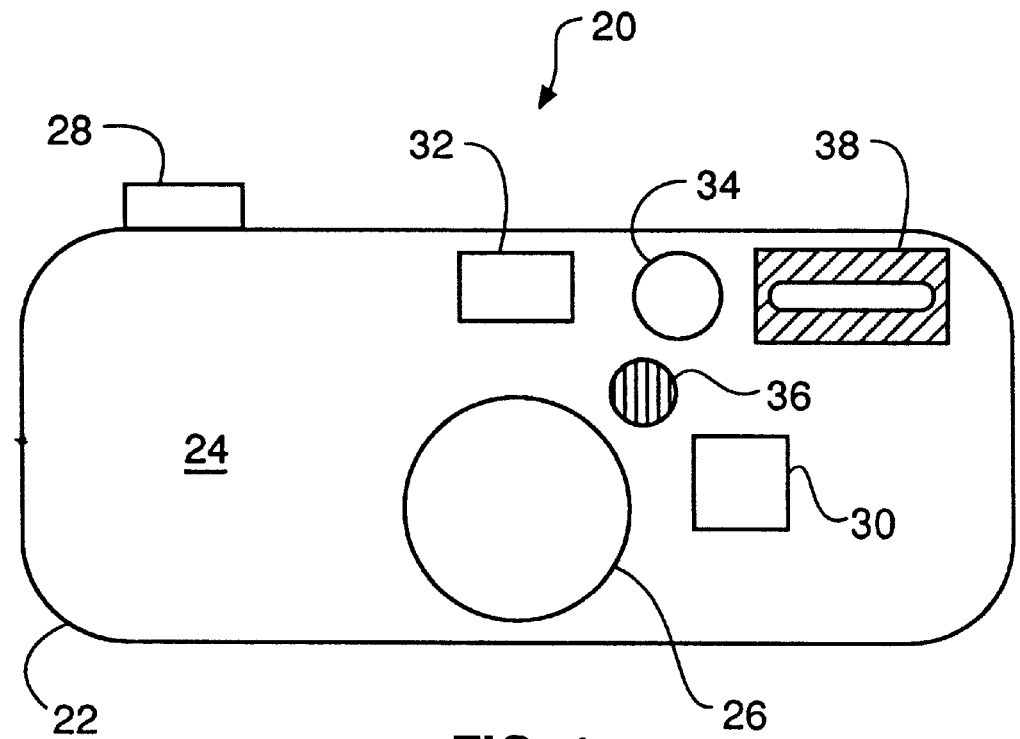
FIG. 1 is a front view of a camera constructed in accordance with the present invention.

FIG. 1 shows a camera 20 constructed in accordance with the present invention having a camera body 22 including a front surface 24 on which is located an objective lens 26 that permits light to enter the camera body. The camera can be constructed, for example, as a photographic camera that produces exposed frmnes on a roll of photographic film or as a solid state camera that stores electronic representations of images in storage media. The image created by the objective lens is captured, either by exposing a frame of photographic film or activating a photosensor of a solid-state imager. The camera 20 also includes a shutter release 28 that initiates the image capture sequence. A camera user views a scene, of which the captured image will be produced, through a viewfinder 30. The front surface 24 of the camera also includes a light-sensing photocell 32 of a passive ranging system that determines distance from the camera 20 to an object in response to the sensed light in the scene. The camera also includes an auxiliary light source 34 that provides supplemental visible-light illumination into the scene. The supplemental illumination is received by the passive ranging system photocell 32 when needed to determine distance. The auxiliary light source also is used to indicate self-timer activation status, assist a camera user in aiming the camera, and, if flash photography is called for, provides red-eye reduction illumination. Thus, multiple functions are performed by the single auxiliary light source 34, thereby reducing the number of camera components otherwise needed.

The auxiliary light source 34 provides supplemental illumination for reception by the passive ranging system sensor 32 because the light it emits is aligned with the objective lens 26 such that an object that is illuminated by the auxiliary light source will be substantially centered in any captured frame of the photographic film or photosensor of the solid-state imager. In accordance with the invention, the auxiliary light source is automatically operated by a light source controller if the passive ranging system of the camera determines that insufficient light is being received for it to determine range. Because the auxiliary light source emits light in the visible range and is aligned with the objective lens, the light source causes a visible point of light to appear on a central object in the scene, wherever the camera is aimed. The point of light can be observed through the camera viewfinder 30 and also with the unaided eye. In this way, the auxiliary light source 34 provides a camera aiming light under conditions where the ambient light in the scene might be of a reduced intensity level and where sighting a desired object through the camera viewfmder might otherwise be difficult.

If the self-timer mode is selected, so that the camera shutter mechanism is operated a predetermined delay time interval after actuation of the shutter release 28 to produce a captured image, then the auxiliary light source is operated in a fashion that communicates the status of the self-timer interval to persons in the scene. For example, the light can be turned off and on at different rates in response to the amount of time remaining in the delay time interval.

If the red-eye reduction mode is selected and the shutter release 28 is actuated, then a red-eye reduction cycle is performed in which the auxiliary light source 34 is operated and then is extinguished a predetermined red-eye time interval prior to activation of the shutter mechanism. The red-eye time interval is selected to be of sufficient time to elicit a pupil contraction reflex and thereby substantially reduce the red-eye effect in the resulting captured image.

Figure 2:
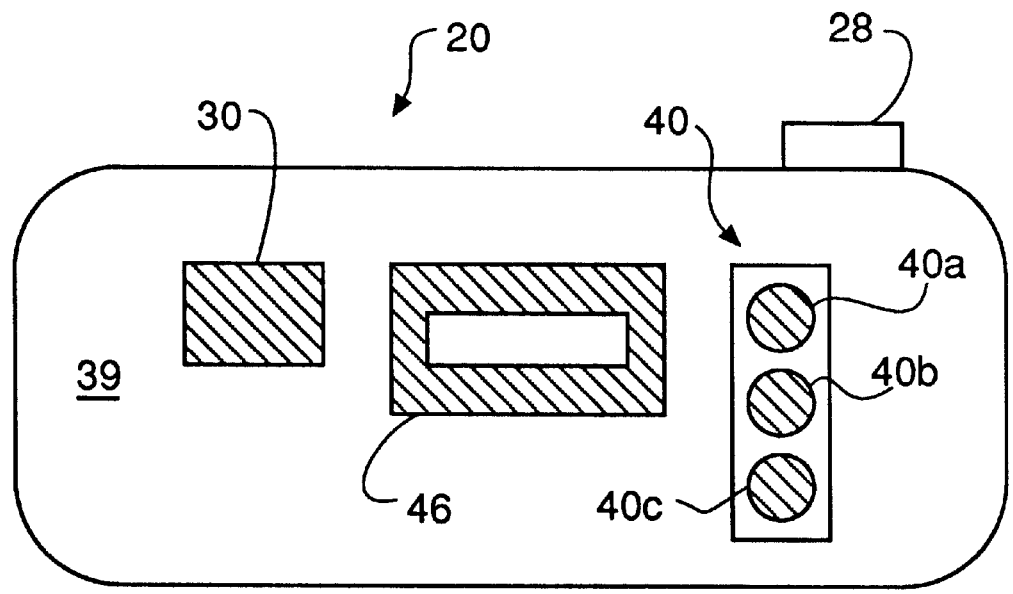
FIG. 2 is a rear view of the camera illustrated in FIG. 1.

The camera 20 also includes an automatic exposure system having a photoelectric cell 36 (also referred to as a CdS cell) that receives ambient light and a flash unit 38 that provides additional scene illumination while the shutter mechanism is operating. The camera also includes mode control switches in a switch block 40 which is visible in the view of the camera back 39 illustrated in FIG. 2. The mode control switches include a self-timer switch 40a that activates the self-timer system of the camera, a red-eye reduction switch 40b that selects the red-eye reduction feature, and a flash defeat switch 40c that disables the flash unit 38 for existing-light image capture. As shown in FIG. 2, the back surface 39 of the camera 20 also includes a data display 46 on which information, such as an image counter that indicates the number of captured images, is included. Also visible in FIG. 2 is the rear opening of the viewfinder 30.

Figure 3:
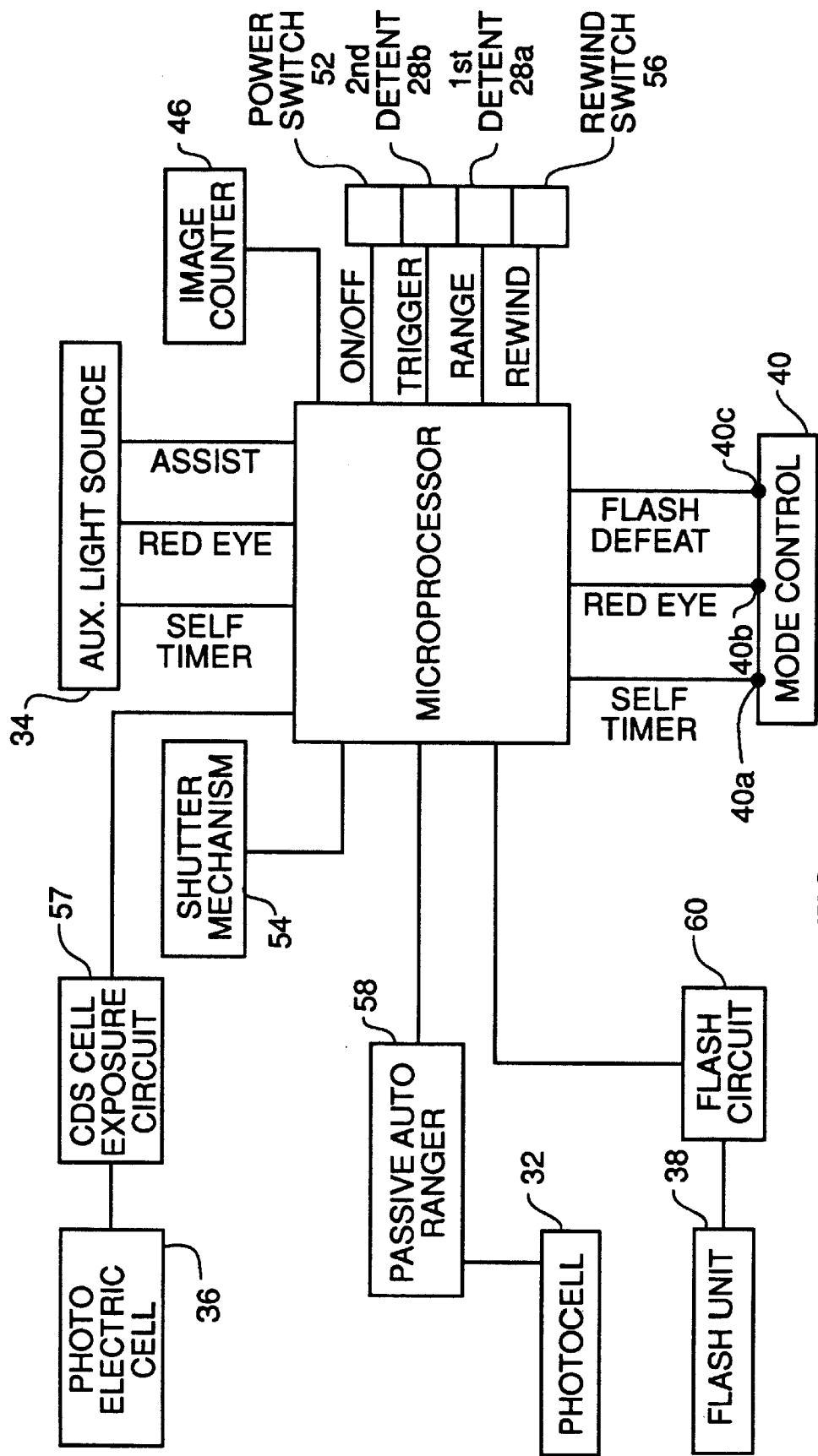
FIG. 3 is a block diagram of the auxiliary light system provided in the camera illustrated in FIG. 1.

The operation of the camera 20 will be better understood with reference to the camera block diagram illustrated in FIG. 3. The operation of the various camera components is controlled by a controller comprising a microprocessor 50. A power switch 52 provides an on/off signal to the microprocessor that controls application of electrical power to components of the camera. The shutter release 28 is a two-position switch having a first detent 28a that produces a ranging signal and a second detent 28b that produces a shutter trigger signal. Thus, pressing the shutter release to the first detent ranging position activates the ranging signal and fully pressing the shutter release to the second detent trigger position produces the shutter trigger signal. The microprocessor 50 responds to the shutter trigger signal by actuating a shutter mechanism 54 that captures an image.

The camera 20 includes a rewind switch 56 that causes the film in the camera to be rewound in the case of a film camera or causes release of storage media in the case of a solid-state camera. An automatic exposure circuit 57 receives a light level signal from the photoelectric cell 36 and determines if supplemental illumination is needed for proper exposure. Finally, the camera includes an auto-ranging module 58 that receives the photocell 32 signal and a flash circuit 60 that operates the flash lamp 38. In response to operation of the switches 28, 52 and the signals produced from the ranging photocell 32 and photoelectric cell 36, the microprocessor 50 produces self-timer, red-eye, and ranging assist signals to control operation of the auxiliary light source 34. These signals are shown in FIG. 3 as control inputs to the light source 34.

In particular, using the mode control switch block 40, the camera user selects between a self-timer mode, a red-eye reduction mode, and a flash defeat mode. The microprocessor 50 responds to actuation of the shutter release 28 to the ranging detent 28a by obtaining the signal from the passive auto-ranging module 58. If the auto-ranging module indicates that insufficient light has been received through the photocell 32 for the ranging system to determine distance, then the microprocessor 50 sends an assist signal to the auxiliary light source 34. The operation of the light source in the ranging assist mode is described further below. When the shutter release 28 is pressed to the ranging detent 28a, the microprocessor also receives the light level signal from the exposure system photoelectric cell 36.

Before the microprocessor 50 operates the shutter mechanism 54, the microprocessor checks to determine if the red-eye reduction mode has been selected. In the red-eye reduction mode, the microprocessor turns off the auxiliary light source 34 a predetermined time interval after the shutter release has been moved to the shutter trigger detent 28b. After the auxiliary light source has been turned off, the microprocessor activates the shutter mechanism. In this way, no visible light from the auxiliary light source will be present in the ambient scene when the image is captured. If the flash defeat signal was selected by the mode control switches, then the microprocessor 50 inhibits activation of the flash circuit 60. In the preferred embodiment, the microprocessor also does not activate the auxiliary light source for red-eye reduction if the flash defeat mode has been selected, even if the automatic exposure circuit 57 indicates flash is needed.

Figure 4:
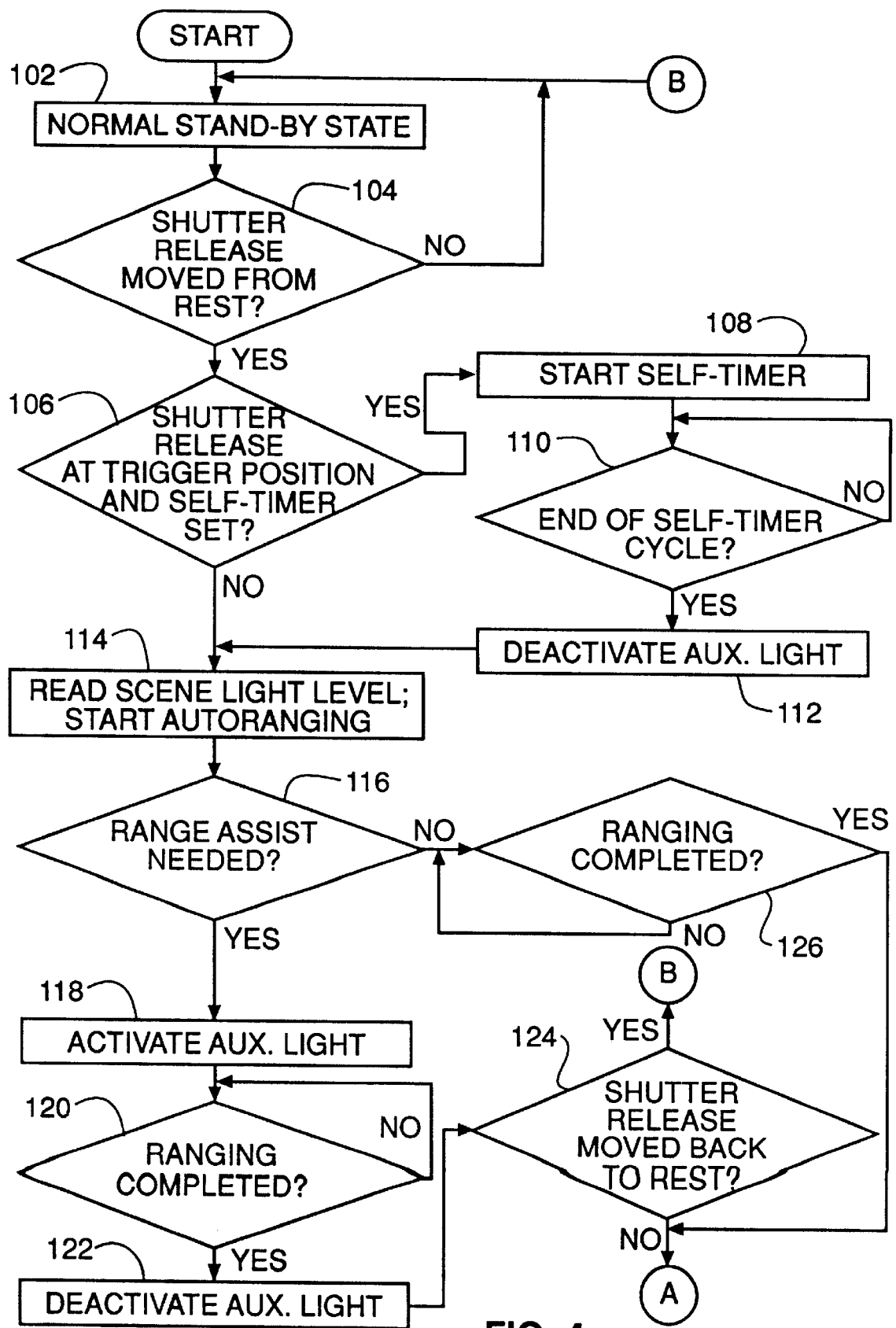
FIG. 4 and FIG. 5 are flow diagrams of the operation of the camera operation for the camera illustrated in FIG. 1.
Figure 5:
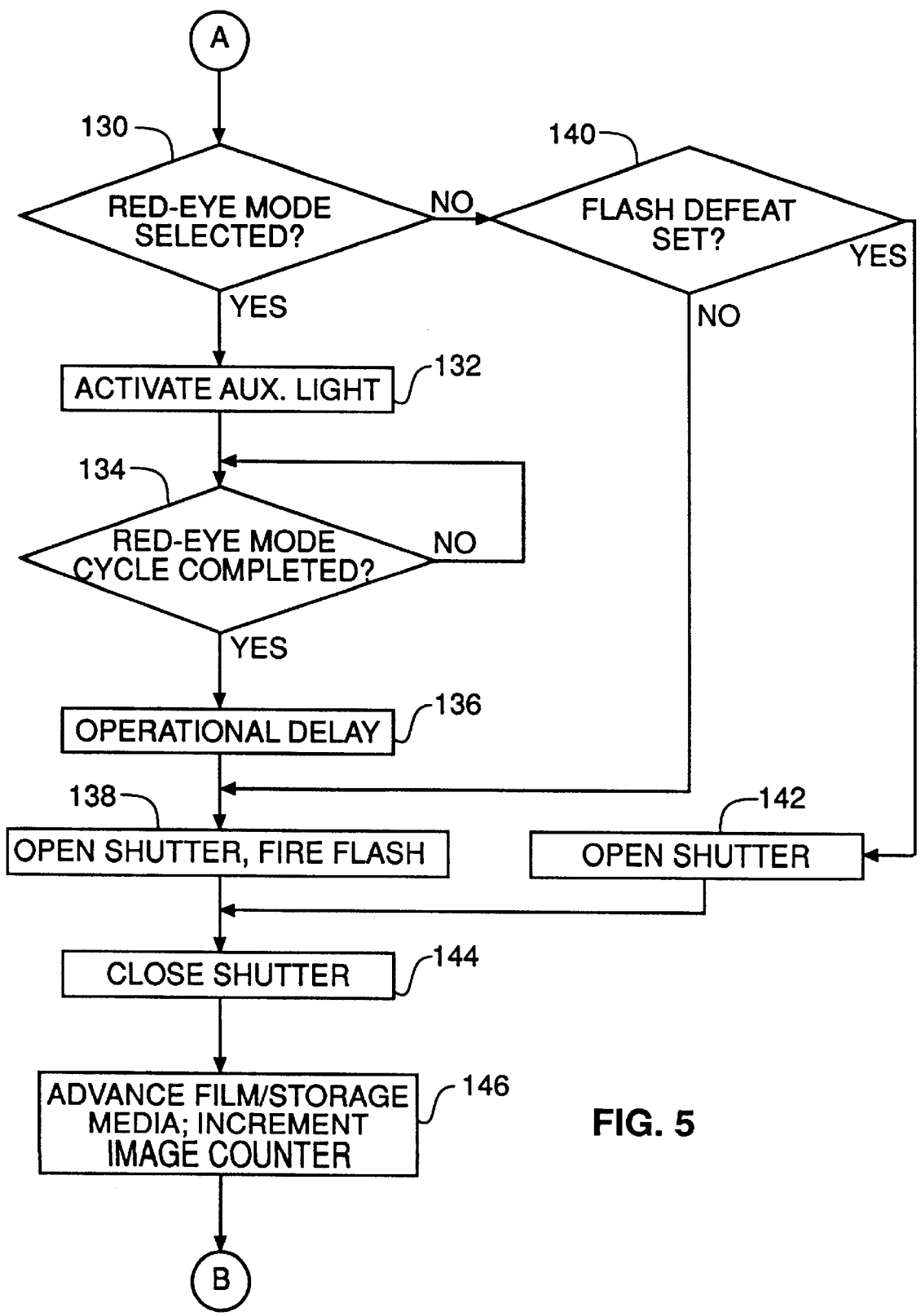

Operation of the camera 20 will be better understood with reference to the flow diagrams of FIG. 4 and FIG. 5, which illustrate the operation of the camera 20. Ordinarily, after the camera has been turned on, the camera waits in a normal standby state, as indicated by the flow diagram box numbered 102. During the standby state, the microprocessor monitors the position of the shutter release 28, as indicated by the decision box numbered 104. So long as the shutter release has not been pressed, meaning it has not moved from the rest position, the camera remains in the standby state and processing returns to the flow diagram box numbered 102. If the shutter release is pressed, an affirmative outcome at the decision box numbered 104, then the microprocessor next checks to determine if the self-timer has been set and the shutter release moved to the second, trigger detent, thereby activating the self-timer cycle. The step of checking the self-timer is represented by the FIG. 4 decision box numbered 106.

If the self-timer mode switch has been set and the shutter has been tripped, an affirmative outcome at the decision box numbered 106, then the camera starts a self-timer mode of operation, indicated by the flow diagram box numbered 108. In the self-timer mode operation cycle, the camera repeatedly checks to determine if the end of the cycle has been reached, as indicated by the decision box numbered 110. If the self-timer cycle has not ended, a negative outcome, then the camera continues to wait in the self-timer loop by returning to the decision box 110. If the self-timer cycle has ended, an affirmative outcome at the decision box numbered 110, then the next step is for the camera to deactivate the auxiliary light source. The deactivation is represented by the flow diagram box numbered 112.

If the self-timer mode was not set, a negative outcome at the FIG. 4 decision box numbered 106, or if the self-timer cycle has ended and the auxiliary light source has been deactivated at box 112, then the next step for the camera to perform is to read the light level and start an auto-ranging distance calculation, as indicated by the flow diagram box numbered 114. Next, as represented by the decision box numbered 116, the microprocessor determines if auxiliary illumination is needed for the ranging function by checking the signal received from the ranging circuit.

If additional illumination is needed, an affirmative outcome at the decision box numbered 116, then the microprocessor activates the auxiliary light source, as represented by the flow diagram box numbered 118. The microprocessor checks to determine if the ranging has been completed at the decision box numbered 120. If ranging was not completed, the auxiliary light source remains lit while the ranging continues as represented by the return loop to the decision box 120. After ranging is completed, an affirmative outcome at the decision box numbered 120, the auxiliary light is deactivated, as represented by the flow diagram box numbered 122. If the shutter release is then returned to the rest position, meaning the user decided not to capture an image, then the microprocessor controller returns to the standby state, as represented by the decision box 124.

If ranging auxiliary lighting was not needed, a negative outcome at decision box 116, then the microprocessor next checks to determine if the ranging cycle has been completed, as represented by the decision box numbered 126. If the ranging has not been completed, a negative outcome, then the microprocessor processing loops back to the input of the decision box numbered 126. If the ranging cycle has been completed, an affirmative outcome at the decision box numbered 126, then processing proceeds to the off-page connector labelled A. The processing of the camera following the connector A is represented by the flow diagram illustrated in FIG. 5.

In FIG. 5, the microprocessor operation following the connector A begins with determining if the red-eye reduction mode has been selected, as represented by the flow diagram box numbered 130. If the red-eye reduction mode has been selected, an affirmative outcome at the decision box numbered 130, then the microprocessor enables the auxiliary light source, represented by the flow diagram box numbered 132. Next, the microprocessor determines if the red-eye reduction mode cycle of operation has been completed. If it has not, then operation of the red-eye reduction mode continues, as represented by the decision box numbered 134 and the operational path returning from the negative outcome of the decision box back to the input.

In accordance with the preferred embodiment of the invention, the red-eye reduction mode includes operating the auxiliary light source 34 at a maximum brightness illumination intensity. The auxiliary light source is illuminated in this fashion for a predetermined time interval. It has been determined that a typical pupil of the eye constricts in response to a bright light at approximately 300 to 650 milliseconds after exposure to the bright light. Therefore, in the preferred embodiment, the microprocessor follows the completion of the red-eye illumination cycle with an operational delay of approximately 350 milliseconds to permit the pupils of persons in the scene to constrict, thereby reducing the "red-eye" effect. The operational delay is represented by the flow diagram box numbered 136.

If the red-eye reduction mode is not selected, a negative outcome at the decision box numbered 130, then the microprocessor next determines if the flash defeat mode was selected, as represented by the decision box numbered 140. If the red-eye reduction mode was selected and the red-eye reduction mode operational delay has ended (after box 136), or if the red-eye reduction mode was not selected and flash defeat was not selected (a negative outcome at box 140), then the microprocessor opens the shutter mechanism and operates the flash circuit to fire the flash lamp 38 to capture an image, as indicated by the flow diagram box numbered 138. If the red-eye reduction mode was not selected, but the flash defeat mode was selected (an affirmative outcome at box 140), then the microprocessor opens the shutter mechanism to capture an image, as indicated by the flow diagram box numbered 142. After the shutter mechanism has been opened, with or without flash illumination, the microprocessor closes the shutter mechanism, as represented by the flow diagram box numbered 144. Finally, the microprocessor causes the photographic film to be advanced to the next frame position, or prepares for the storage of the next frame of image data, as the case may be, and increments the image counter, as represented by the flow diagram box numbered 146. Operation of the microprocessor then proceeds to the normal standby state, as indicated by the off-page connector B, which leads to the FIG. 4 flow diagram box numbered 102.

Figure 6:
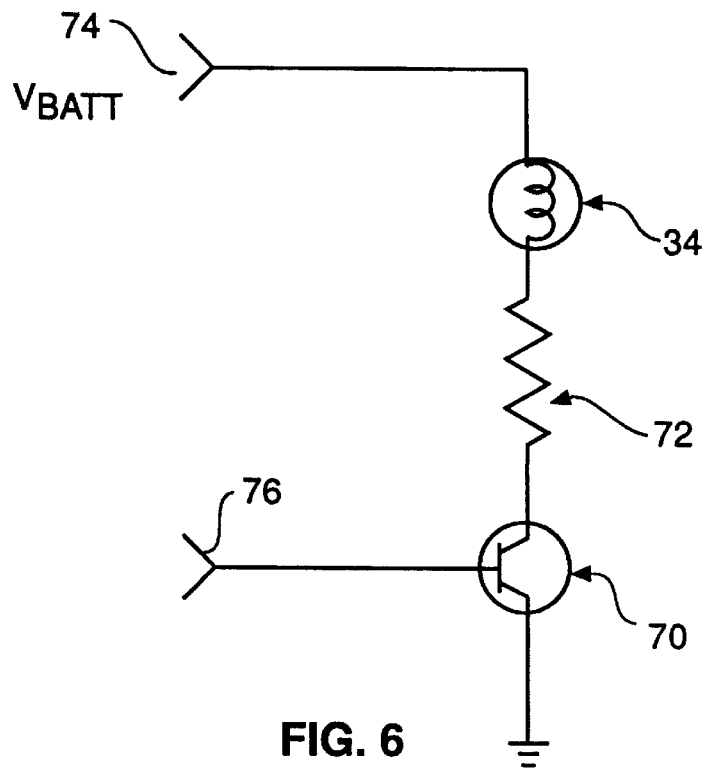
FIG. 6 is a schematic diagram of the light source circuit of the auxiliary light system illustrated in FIG. 3.

The construction of the camera electrical circuit including the auxiliary light source in the preferred embodiment is illustrated in the FIG. 6 circuit diagram. The auxiliary light source 34 is preferably provided as a light emitting diode (LED), the current through which is controlled by an electronic switch 70 (illustrated as a transistor) and a current limiting resistor 72. The auxiliary light source also can be an incandescent bulb or an organic LED (OLED). Various electronic switches can be used, such as bipolar transistors and field effect transistors (FET), and will occur to those skilled in the art without further explanation.

Battery voltage is shown being supplied to the auxiliary light source 34 from a first circuit connection 74. The FIG. 6 circuit diagram shows that, in the preferred embodiment, current through the auxiliary light source is controlled by the electronic switch in response to a switch control signal received from the microprocessor at a second circuit connection 76 comprising a switch gate connection. Thus, the more current permitted to flow through the electronic switch by the microprocessor switch control signal, the brighter the perceived illumination from the auxiliary light source. In this way, a full range of brightening and dimming of the auxiliary light source 34 is provided.

Figure 7:
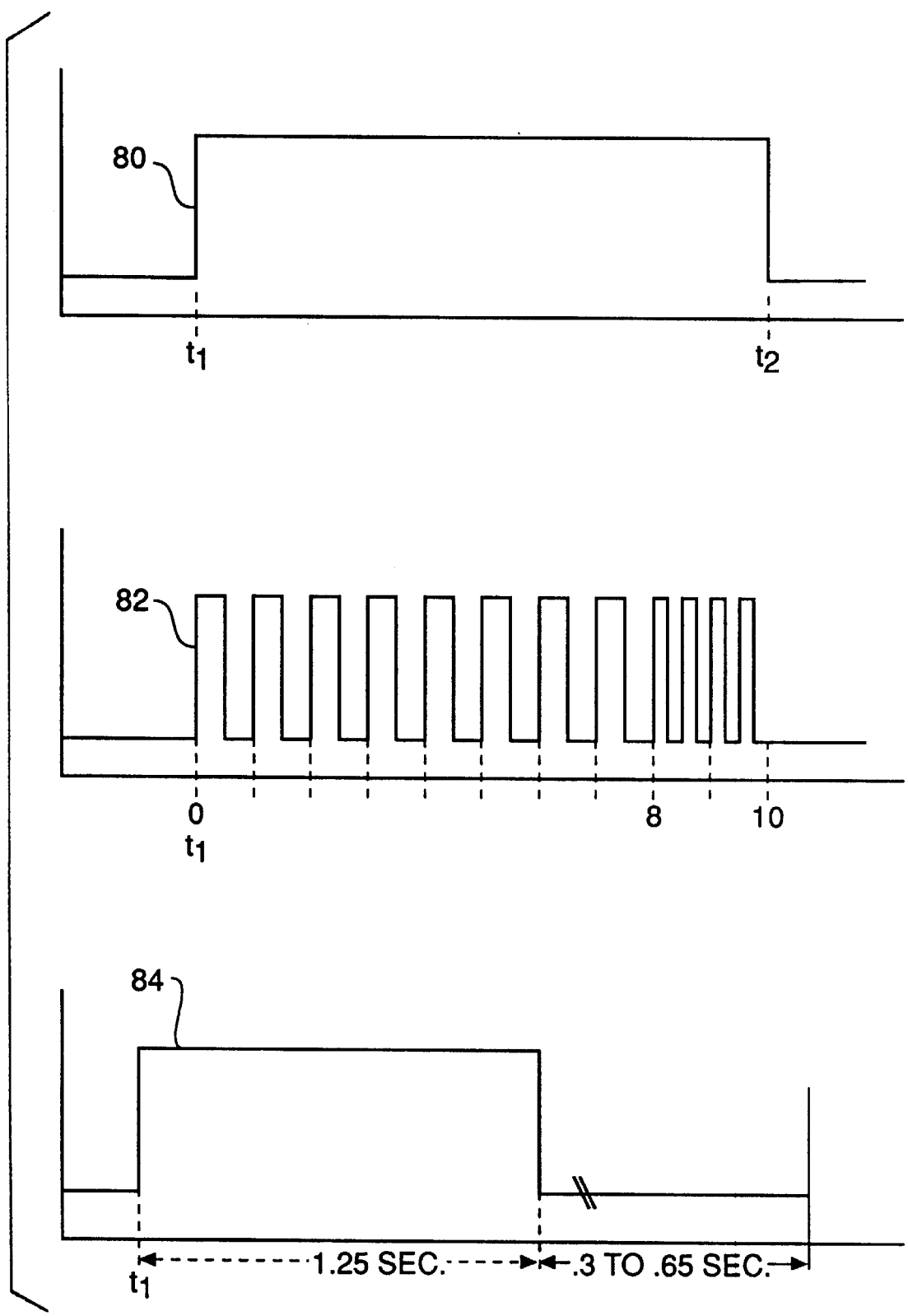
FIG. 7 is a timing diagram of the light source circuit operation for the auxiliary light system illustrated in FIG. 3.

Brightness of the auxiliary light source 34 and any desired blinking can be achieved using pulse width modulation (PWM) techniques. FIG. 7 shows a variety of duty cycles representing light source current as a function of time, in accordance with the different operating modes that were described above. The waveforms all show an initial activation at a time $t_1$ that represents pressing the shutter release. The time axes are otherwise independent for each waveform.

The first waveform 80 shows the ranging assist mode, which is automatically activated by the auto-ranging system in response to low light. The first waveform 80 shows that the auxiliary light source is steadily illuminated while the ranging assist is active. The supplemental illumination of the auxiliary light source is activated from the first detent position of the shutter release to the second detent position while ranging assist is needed, or until the shutter release is no longer actuated at the first detent position. The first waveform assumes the shutter release is pressed at $t_1$ and ranging is completed at $t_2$. The time interval is typically 2.0 to 1000 msec. In this way, the auxiliary light source provides an aiming light that can be viewed under low light conditions simply by holding the shutter release at the first detent position.

The second waveform 82 in FIG. 7 shows the self-timer mode of operation. Those skilled in the art will appreciate that many different self-timer operating schemes can be used. In the preferred embodiment, the self-timer scheme is for the auxiliary light source to be pulsed on and off once per second for the first eight seconds of the self-timer interval at a fifty percent duty cycle and then for the auxiliary light source to be pulsed at two on-off cycles per second for two more seconds in accordance with a fifty percent duty cycle. That is, during a ten second self-timer interval, the auxiliary light source is illuminated on for one-half second and then off for one-half second for the first eight seconds, then is turned on for one-quarter second, then off for one-quarter second, on for one-quarter second, and off for one-quarter second. At the conclusion of the last "off" quarter second, the shutter mechanism is triggered.

The final waveform 84 in FIG. 7 illustrates the red-eye reduction mode of operation and shows the auxiliary light source is turned on at maximum brightness for approximately a 1.25 second interval, followed by a 0.3 to 0.65 second delay. At the end of the delay, the flash is operated. That is, at the start of the red-eye reduction mode at $t_1$, the auxiliary light source is turned on for 1.25 seconds. When the auxiliary light source is turned off, the above-referenced operational delay is invoked for a time interval of between 0.3 and 0.65 seconds. At the end of the operational delay, the shutter mechanism is activated and an image is captured.

Figure 8:
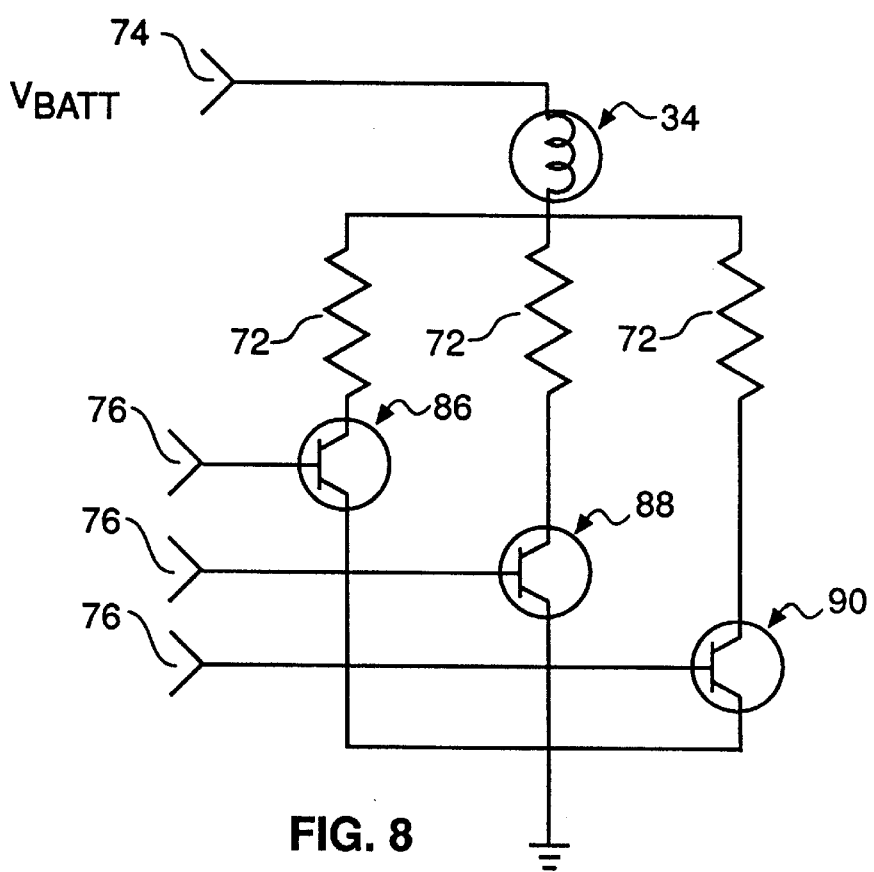
FIG. 8 is a schematic diagram of an alternative construction of the light source circuit for the system illustrated in FIG. 3.

Control of the auxiliary light source can be implemented in a variety of circuits, as will be appreciated by those skilled in the art. FIG. 8 is an example of an alternative construction for controlling the intensity of the light source. FIG. 8 shows the auxiliary light source 34 receiving battery voltage from a first connection 74. The current through the auxiliary light source, unlike the first embodiment illustrated in FIG. 6, is controlled by a network of three electronic switches, each switch being controlled by a different signal from the microprocessor. Thus, a first control signal is received by a first switch 86, a second control signal is received by a second switch 88, and a third control signal is received by a third switch 90. The embodiment illustrated in FIG. 6 has the advantage of utilizing only a single switch, thereby keeping the number of components down to a minimum.

Each switch 86, 88, 90 is associated with a resistance 72, and each switch receives a control signal from the microprocessor at a gate connection 76. If all switches are conducting, then the brightness of the auxiliary light source will be at a maximum. The dimmest illumination will be achieved when only one of the switches is conducting. Preferably, the brightest illumination level is reserved for the ranging assist mode and the red-eye reduction mode. This ensures the most accurate ranging and the maximum red-eye reduction effect. Brightness level for the ranging assist mode must be sufficiently bright to permit the ranging system to operate properly and determine camera-to-object distance. The brightness level of the auxiliary light source in the self-timer mode must be sufficiently bright so that it can be observed by persons in the photographic scene. This typically will be reduced level of brightness less than the level of brightness for the ranging assist mode and the red-eye reduction mode. Those skilled in the art will appreciate that the resistances associated with each electronic switch need not be equal.

As noted above, the light source controller microprocessor 50 of the preferred embodiment controls the illumination intensity of the auxiliary light source 34 to be at a maximum level for the range assist function. The range assist illumination intensity thereby comprises a first lighting level. In accordance with another preferred embodiment of the invention, the microprocessor controls the illumination intensity of the auxiliary light source at a second lighting level for the red-eye reduction mode and at a third level for the self-timer mode in response to the detected ambient light level in the scene. In particular, the microprocessor receives a light level indication from either the ranging system photocell 32 or the exposure system photoelectric cell 36 and adjusts the auxiliary light source brightness accordingly.

Figure 9:
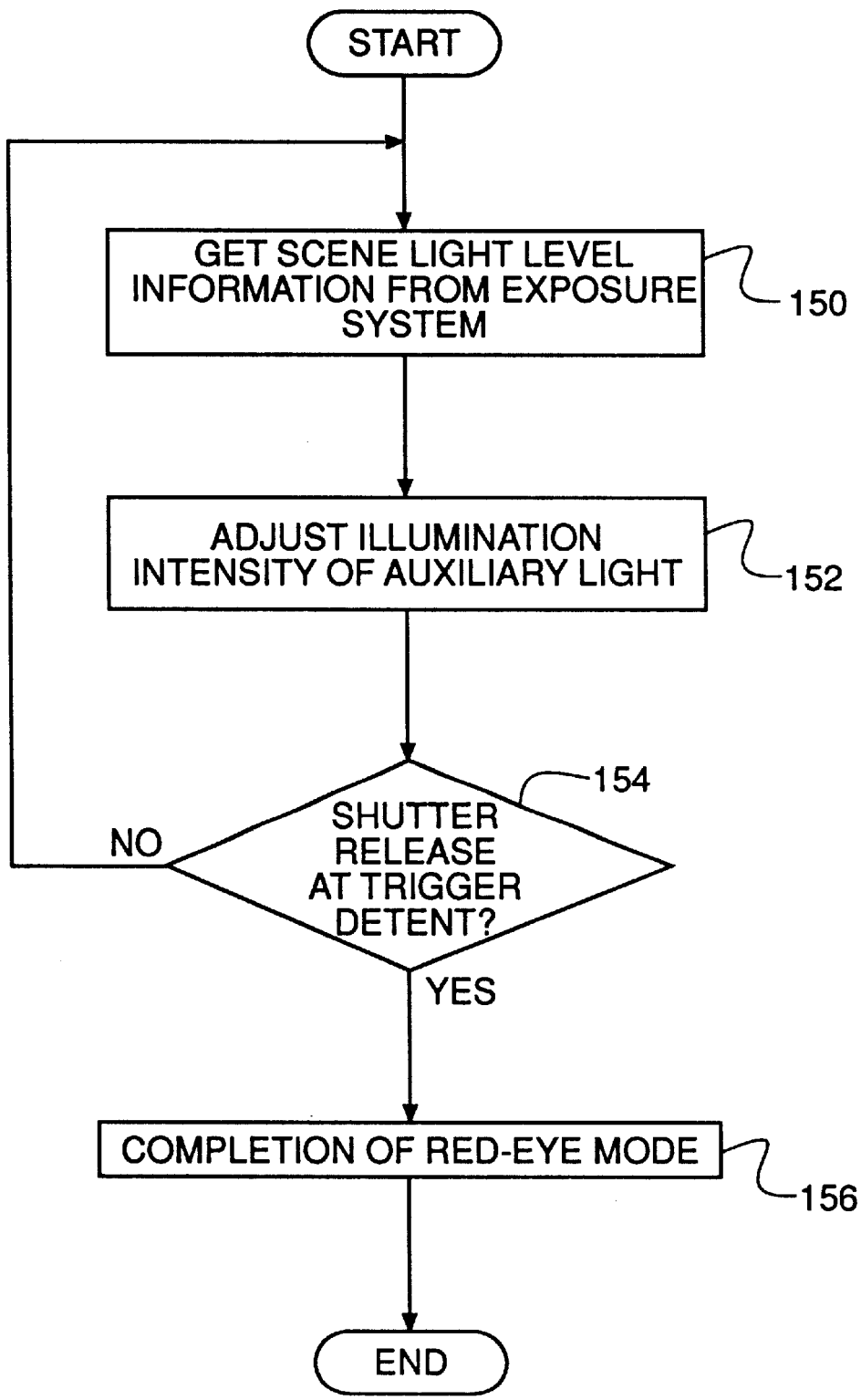
FIG. 9 is a flow diagram illustrating control of the light source illumination intensity for the red-eye reduction mode.
Figure 10:
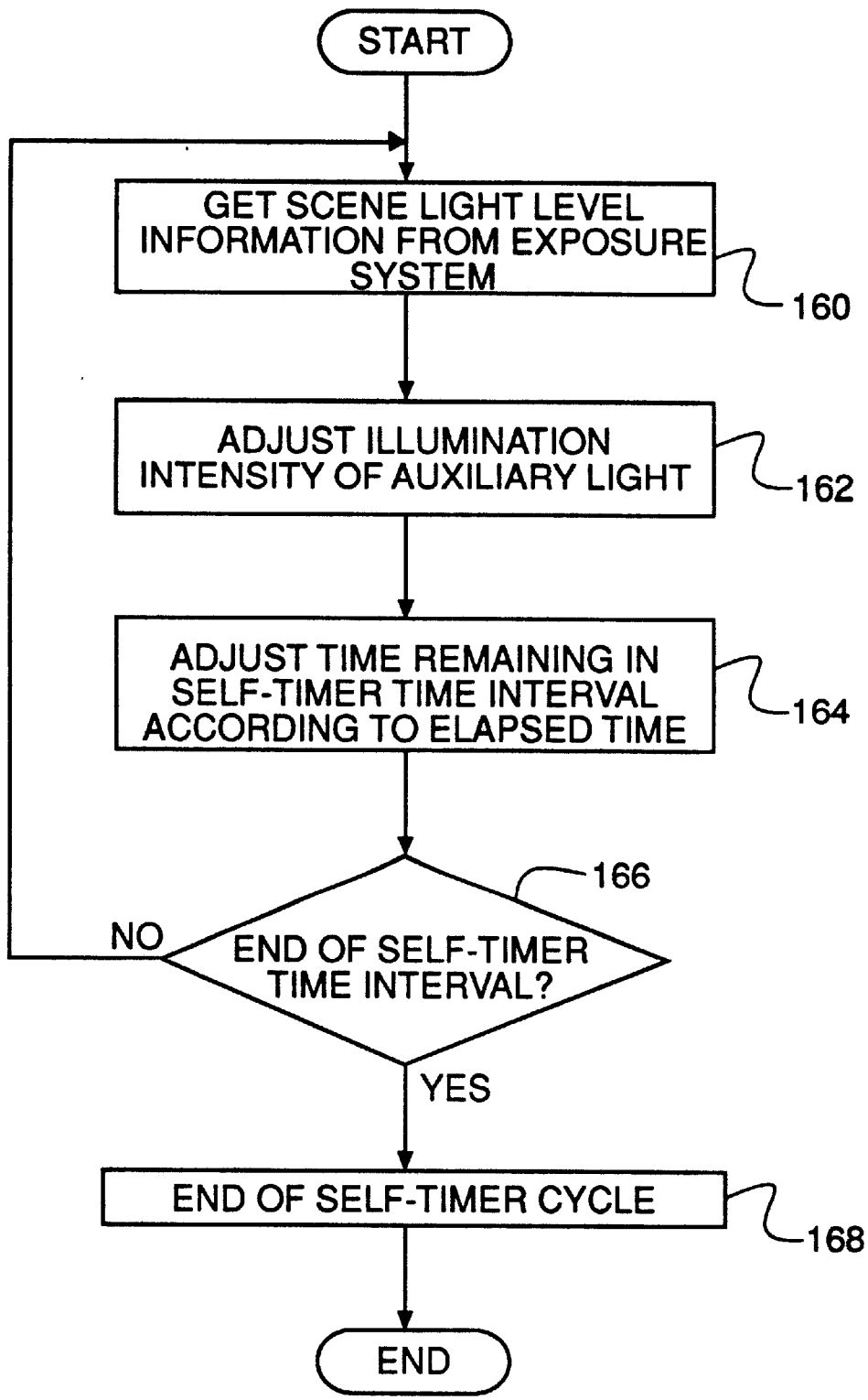
FIG. 10 is a flow diagram illustrating control of the light source illumination intensity for the self-timer mode.

The adjustment of the auxiliary light source brightness is illustrated in the flow diagrams of FIG. 9 and FIG. 10. FIG. 9 represents the red-eye reduction mode illumination adjustment process, which takes place during the processing represented by the flow diagram box numbered 132 of FIG. 5. FIG. 10 represents the self-timer mode illumination adjustment process, which takes place during the processing represented by the flow diagram box numbered 110 of FIG. 4.

FIG. 9 shows that the red-eye mode illumination adjustment begins with obtaining the scene ambient light level from a sensor, which preferably is the exposure system photoelectric cell because of its broader area coverage relative to the ranging photocell. The step of obtaining ambient light level is represented by the flow diagram box numbered 150. The next step, represented by the box numbered 152, is to adjust the illumination level of the auxiliary light source. The precise level is selected by the camera designer, but is generally selected so that, the greater the ambient light level, the less the illumination intensity. This relationship is selected in recognition of the fact that the greater the ambient light level, the less dilated the pupils will be and therefore the less need for red-eye reduction through the auxiliary light source. The next step is to determine if the shutter release is at the trigger detect position, as indicated by the decision box numbered 154. If the shutter release is at the trigger position, then the camera user has elected to capture an image and therefore at box 156 the completion of the red-eye mode is indicated. Processing resumes at box 134 and box 136 of FIG. 5.

FIG. 10 shows that the self-timer mode illumination adjustment begins with obtaining the scene ambient light level from the sensor. The step of obtaining ambient light level is represented by the flow diagram box numbered 160. The next step, represented by the box numbered 162, is to adjust the illumination level of the auxiliary light source. The precise level is selected by the camera designer, but for the self-timer mode is generally selected so that the greater the ambient light level, the greater the illumination intensity. This relationship is selected in recognition of the fact that the greater the ambient light level, the greater the illumination of the auxiliary light source needed for it to be perceived by a person in the scene. The next step in the self-timer mode is to adjust the self-timer time interval, as represented by the flow diagram box numbered 164, and then to check for the end of the self-timer interval at the decision box numbered 166. That is, the self-timer interval is set by starting an elapsed time count at zero and incrementing a clock value until the interval time limit is reached, at which time the end of the self-timer interval is indicated at box 168, or a time interval value is set to an initial clock value and is decremented until it reaches zero, at which time the end of the self-timer interval is indicated at box 168. Processing then resumes at the FIG. 4 flow diagram box numbered 112, where the auxiliary light source is extinguished and the ranging function is performed for capture of an image.

The present invention has been described above in terms of presently preferred embodiments so that an understanding of the present invention can be conveyed. There are, however, many configurations for auxiliary light control systems not specifically described herein, but with which the present invention is applicable. The present invention should therefore not be seen as limited to the particular embodiment described herein, but rather, it should be understood that the present invention has wide applicability with respect to auxiliary light control systems generally. All modification, variations, or equivalent arrangements that are within the scope of the attached claims therefore should be considered within the scope of the invention.

The following elements and their corresponding reference numerals are used in the drawings:

camera 20
camera body 22
front surface 24
objective lens 26
shutter release 28
shutter release first detent 28a
shutter release second detent 28b
viewfinder 30
photocell 32
auxiliary light source 34
photoelectric cell 36
flash unit 38
camera back 39
mode control switch block 40
switch block self-timer switch 40a
switch block red-eye reduction switch 40b
switch block flash defeat switch 40c
data display 46
microprocessor 50
power switch 52
shutter mechanism 54
rewind switch 56
automatic exposure circuit 57
passive auto-ranging module 58
flash circuit 60
electronic switch 70
resistor 72
first circuit connection 74
second circuit connection 76
first waveform 80
second waveform 82
final waveform 84
first electronic switch 86
second electronic switch 88
third electronic switch 90

We claim:

1. A camera supplemental illumination circuit comprising:
   a flash light source for providing flash illumination during taking of a picture;
   an auxiliary light source separate from said flash light source that is located on a camera and is operated after actuation of a shutter release of the camera to provide supplemental visible-light illumination into a scene prior to said taking of a picture;
   a red-eye reduction mode selection switch;
   a flash defeat mode selection switch;
   a self-timer mode selection switch
   a light sensor that receives light from the scene and produces a signal that indicates the relative amount of light that was received; and
   a light source controller that receives a ranging assist signal from a passive ranging system if the light sensor signal indicates the light was insufficient for the passive ranging system to determine distance to the object, responds to the ranging assist signal by operating the auxiliary light source, such that the supplemental visible-light illumination increases the amount of received light sufficiently for the passive ranging system to make a distance determination, until the passive ranging system has determined the distance, and further controls operation of the auxiliary light source such that the light source controller responds to mode control switch selection of the red-eye reduction mode by operating the auxiliary light source, for a predetermined period of time ending at predefined period of time prior to operation of a shutter mechanism, such that the supplemental visible-light illumination has a predetermined level of brightness that ordinarily causes a constriction reaction in eyes of persons in the scene who view the supplemental visible-light illumination, if the light source controller received a flash signal from an automatic exposure system, responds to mode control switch selection of the self-timer mode by operating the auxiliary light source for a predetermined self-timer time interval prior to operation of the shutter mechanism, and responds to mode control switch selection of the flash defeat mode by inhibiting operation of the auxiliary light source.

2. A camera supplemental illumination circuit as defined in claim 1, wherein the light source controller operates the auxiliary light source at a first brightness level in response to the ranging assist signal and operates the auxiliary light source at a second brightness level in response to the red-eye reduction mode.

3. A camera supplemental illumination circuit as defined in claim 2, wherein the first brightness level is a maximum brightness level that can be maintained by the light source controller.

4. A camera supplemental illumination circuit as defined in claim 2, wherein the first brightness level is greater than or equal to the second brightness level.

5. A camera supplemental illumination circuit as defined in claim 4, wherein the light source controller operates the auxiliary light source at a third brightness level in response to the self-timer mode.

6. A camera supplemental illumination circuit as defined in claim 5, wherein the light source controller sets the second brightness level and third brightness level in response to the light sensor signal.

7. A camera supplemental illumination circuit as defined in claim 1, further including a self-timer mode selection switch, wherein:
   the light source controller responds to selection of the self-timer mode by operating the auxiliary light source for a predetermined self-timer time interval prior to operation of the shutter mechanism.

8. A camera supplemental illumination circuit as defined in claim 7, wherein the light source controller, in the self-timer mode, operates the auxiliary light source on and off at a first frequency for a first sub-interval of the predetermined self-timer time interval and operates the auxiliary light source on and off at a second frequency for a second sub-interval of the predetermined self-timer time interval.

9. A camera supplemental illumination circuit as defined in claim 1, wherein the auxiliary light source comprises a light emitting diode (LED).

10. A camera supplemental illumination circuit as defined in claim 9, wherein the light source controller controls electrical current through the LED and thereby controls the brightness of the auxiliary light source.

11. A camera supplemental illumination circuit as defined in claim 10, further including at least one transistor connected in series with the LED, and wherein the light source controller controls the electrical current through the LED by producing a gate signal that controls the operation of the transistor.

12. A camera auxiliary lighting system comprising:
a flash light source for providing flash illumination during taking of a picture;
a light sensor that receives light from a scene in front of a camera and produces a signal that indicates the relative amount of light that was received;
a passive ranging system that determines distance from the camera to an object in the photographic scene in response to the light sensor signal and produces a ranging assist signal if the light sensor signal indicates the light received was insufficient to determine the distance;
an exposure control system that measures ambient light in the captured scene and determines if sufficient ambient light exists to produce a captured image having correct exposure;
an auxiliary light source separate from said flash light source that is operated to provide supplemental visible-light illumination into the scene prior to said taking of a picture;
a red-eye reduction mode switch that selects a red-eye reduction mode of operation;
a flash defeat mode switch that selects a flash defeat mode of operation;
light source controller that initiates an image capture sequence in response to actuation of a shutter release, and responds to the ranging assist signal by operating the auxiliary light source, such that the supplemental visible-light illumination increases the amount of received light sufficiently for the passive ranging system to make a distance determination, until the passive ranging system has determined the distance, and further controls operation of the auxiliary light source such that the light source controller
responds to mode control switch selection of the red-eye reduction mode by operating the auxiliary light source, for a predetermined period of time ending at predefined period of time prior to operation of a shutter mechanism, if the light source controller received a flash signal from an automatic exposure system, such that the supplemental visible-light illumination has a predetermined level of brightness that ordinarily causes a constriction reaction in eyes of persons in the scene who view the supplemental visible-light illumination, and
responds to mode control switch selection of the flash defeat mode by inhibiting operation of the auxiliary light source.

13. A camera auxiliary lighting system as defined in claim 12, wherein the light source controller operates the auxiliary light source at a first brightness level in response to the ranging assist signal and operates the auxiliary light source at a second brightness level in response to the red-eye reduction mode.

14. A camera auxiliary lighting system as defined in claim 13, wherein the first brightness level is a maximum brightness level that can be maintained by the light source controller.

15. A camera auxiliary lighting system as defined in claim 13, wherein the first brightness level is greater than or equal to the second brightness level.

16. A camera auxiliary lighting system as defined in claim 15, wherein the light source controller operates the auxiliary light source at a third brightness level in response to the self-timer mode.

17. A camera auxiliary lighting system as defined in claim 16, wherein the light source controller sets the second brightness level and third brightness level in response to the light sensor signal.

18. A camera auxiliary lighting system as defined in claim 12, further including a self-timer mode selection switch, wherein:
the light source controller responds to selection of the self-timer mode by operating the auxiliary light source for a predetermined self-timer time interval prior to operation of the shutter mechanism.

19. A camera auxiliary lighting system as defined in claim 18, wherein the light source controller, in the self-timer mode, operates the auxiliary light source on and off at a first frequency for a first sub-interval of the predetermined self-timer time interval and operates the auxiliary light source on and off at a second frequency for a second sub-interval of the predetermined self-timer time interval.

20. A camera auxiliary lighting system as defined in claim 12, wherein the auxiliary light source comprises a light emitting diode (LED).

21. A camera auxiliary lighting system as defined in claim 20, wherein the light source controller controls electrical current through the LED and thereby controls the brightness of the auxiliary light source.

22. A camera auxiliary lighting system as defined in claim 21, further including at least one transistor connected in series with the LED, and wherein the light source controller controls the electrical current through the LED by producing a gate signal that controls the operation of the transistor.

23. A camera comprising:
a camera body;
an objective lens that receives light from a scene;
a flash light source for providing flash illumination during taking of a picture;
a passive ranging system that either determines distance from the camera to an object in the scene in response to received light from the scene or indicates that insufficient received light exists to determine the distance;
an exposure control system that measures the ambient light in the scene to determine if sufficient ambient light exists to produce a captured image of correct exposure;
an auxiliary light source separate from said flash light source that operates to provide supplemental visible-light illumination into the scene prior to said taking of a picture in response to an indication from the passive ranging system that insufficient received light exists for it to determine distance, whereby the supplemental illumination increases the amount of received light sufficiently for the passive ranging system to make a distance determination;
a controller that initiates an image capture sequence, during which the controller operates a shutter mechanism of the camera that permits ambient light from the scene to enter the camera through an objective lens, and also initiates a red-eye reduction mode of camera operation, during which the controller operates the auxiliary light source a predetermined time interval prior to operation of the shutter mechanism of the camera such that the supplemental visible-light illumination has a predetermined level of brightness that ordinarily causes a constriction reaction in eyes of persons in the scene who view the supplemental visible-light illumination.

24. A camera as defined in claim 23, wherein the auxiliary light source comprises a light emitting diode (LED).

25. A camera as defined in claim 23, further including:
a self-timer system that operates the shutter mechanism a predetermined self-timer time interval after being activated by the camera user and operates the auxiliary light source a predetermined time before expiration of the predetermined self-timer time interval.

26. A camera comprising:
a camera body;
an objective lens that receives light from a scene;
a flash light source for providing flash illumination during taking of a picture;
a shutter mechanism that is operated so that it opens to permit light from the scene to enter the camera through the objective lens and produce a captured image;
an auxiliary light source separate from said flash light source that is located on the camera body and is operated after actuation of a shutter release of the camera to provide supplemental visible-light illumination into the scene prior to said taking of a picture;
a mode control switch block that selects between a self-timer mode, a red-eye reduction mode, and a flash defeat mode;
a light sensor that receives light from an object in the scene and produces a signal that indicates the relative amount of light that was received;
a passive ranging system that receives the light sensor signal and either determines distance from the camera to the object or produces a ranging assist signal if the light sensor signal indicates that the received light was insufficient to determine distance to the object;
a light source controller that responds to the ranging assist signal by operating the auxiliary light source, such that the supplemental visible-light illumination increases the amount of received light sufficiently for the passive ranging system to make a distance determination, until the passive ranging system has determined the distance, and further controls operation of the auxiliary light source such that the light source controller
responds to mode control switch block selection of the red-eye reduction mode by operating the auxiliary light source, prior to operation of the shutter mechanism, such that the supplemental visible-light illumination has a predetermined level of brightness that ordinarily causes a pupil constriction reaction in eyes of persons in the scene who view the supplemental visible-light illumination, if the light source controller received a flash signal from an automatic exposure system,
responds to mode control switch selection of the self-timer mode by operating the auxiliary light source for a predetermined self-timer time interval prior to operation of the shutter mechanism, and
responds to mode control switch selection of the flash defeat mode by inhibiting operation of the auxiliary light source.

27. A camera as defined in claim 26, wherein the light source controller operates the auxiliary light source at a first brightness level in response to the ranging assist signal and operates the auxiliary light source at a second brightness level in response to the red-eye reduction mode.

28. A camera as defined in claim 27, wherein the first brightness level is a maximum brightness level that can be maintained by the light source controller.

29. A camera as defined in claim 27, wherein the first brightness level is greater than or equal to the second brightness level.

30. A canera as defined in claim 29, wherein the light source controller operates the auxiliary light source at a third brightness level in response to the self-timer mode.

31. A camera as defined in claim 30, wherein the light source controller sets the second brightness level and third brightness level in response to the light sensor signal.

32. A camera as defined in claim 26, wherein the light source controller operates the auxiliary light source in response to the ranging assist signal and maintains operation of the auxiliary light source until the shutter release of the camera is no longer actuated or until the light source controller receives a shutter trigger signal from the shutter release.

33. A camera as defined in claim 26, wherein the light source controller, in the self-timer mode, operates the auxiliary light source on and off at a first frequency for a first sub-interval of the predetermined self-timer time interval and operates the auxiliary light source on and off at a second frequency for a second sub-interval of the predetermined self-timer time interval.

34. A camera as defined in claim 26, wherein the auxiliary light source comprises a light emitting diode (LED).

35. A camera as defined in claim 34, wherein the light source controller controls electrical current through the LED and thereby controls the brightness of the auxiliary light source.

36. A camera as defined in claim 35, further including at least one transistor connected in series with the LED, and wherein the light source controller controls the electrical current through the LED by producing a gate signal that controls the operation of the transistor.

37. A method of controlling a camera auxiliary light source that is separate from a flash light source used during taking of a picture and that provides supplemental visible-light illumination into a photographic scene in response to actuation of a shutter release prior to said taking of a picture, the method comprising the steps of:
operating a passive ranging system that either determines distance from the photographic camera to an object in the photographic scene in response to received light from the photographic scene or indicates if insufficient received light exists to determine the distance;
measuring ambient light in the photographic scene to determine if sufficient ambient light exists to produce a photographic image of correct exposure;
operating the auxiliary light source to provide supplemental visible-light illumination into the photographic scene if the passive ranging system indicates insufficient received light exists for it to determine the distance, whereby the supplemental visible-light illumination increases the amount of received light sufficiently to permit the passive ranging system to make a distance determination, and continuing to operate the auxiliary light source until the passive ranging system has determined the distance;
operating the auxiliary light source if a camera red-eye reduction mode was selected, whereby the supplemental visible-light illumination has a predetermined level of brightness that ordinarily causes a pupil constriction reaction in eyes of persons and animals in the photographic scene who view the supplemental visible-light illumination, if the light source controller received a flash signal from an automatic exposure system, until a shutter trigger signal is received from the shutter release;
operating a shutter mechanism of the camera in response to the shutter trigger signal, thereby permitting ambient light from the scene to enter the camera through an objective lens a predetermined time interval after operation of the auxiliary light source.

38. A method as defined in claim 37, wherein the step of operating the auxiliary light source in response to an indication by the passive ranging system of insufficient received light comprises operating the auxiliary light source at a first brightness level, and the step of operating the auxiliary light source in the red-eye reduction mode comprises operating the auxiliary light source at a second brightness level.

39. A method as defined in claim 38, wherein the second brightness level is a maximum brightness level that can be maintained by the light source controller.

40. A method as defined in claim 38, wherein the first brightness level is less than the second brightness level.

41. A method as defined in claim 37, wherein the step of operating the auxiliary light source in response to the ranging assist signal comprises maintaining operation of the auxiliary light source until the shutter release of the camera is returned to a rest position or until the light source controller receives a shutter trigger signal from the shutter release.

42. A method as defined in claim 37, further including the step of operating the auxiliary light source if a self-timer mode was selected, whereby the auxiliary light source is operated on and off at a first duty cycle for a first sub-interval of a predetermined self-timer time interval and operating the auxiliary light source on and off at a second duty cycle for a second sub-interval of the predetermined self-timer time interval.

43. A method as defined in claim 37, wherein the auxiliary light source comprises a light emitting diode (LED) and operating the auxiliary light source comprises controlling electrical current, through the LED and thereby controlling the brightness of the auxiliary light source.

44. A method as defined in claim 43, wherein controlling the electrical current through the LED comprises producing a gate signal that controls the operation of at least one transistor connected in series with the LED.

45. A method as defined in claim 37, further including the step of inhibiting operation of a flash system prior to the step of operating a shutter mechanism if a flash defeat mode was selected.

* * * * *